(12) United States Patent
Hosokawa et al.

(10) Patent No.: US 11,163,806 B2
(45) Date of Patent: Nov. 2, 2021

(54) OBTAINING CANDIDATES FOR A RELATIONSHIP TYPE AND ITS LABEL

(71) Applicant: INTERNATIONAL BUSINESS MACHINES CORPORATION, Armonk, NY (US)

(72) Inventors: Satoshi Hosokawa, Funabashi (JP); Atsushi Ono, Tokyo (JP); Chikako Oyanagi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 15/166,310

(22) Filed: May 27, 2016

(65) Prior Publication Data
US 2017/0344625 A1 Nov. 30, 2017

(51) Int. Cl.
| | |
|---|---|
| G06F 16/28 | (2019.01) |
| G06N 20/00 | (2019.01) |
| G06N 5/02 | (2006.01) |
| G06F 40/169 | (2020.01) |
| G06F 40/284 | (2020.01) |
| G06F 40/295 | (2020.01) |

(52) U.S. Cl.
CPC .......... *G06F 16/288* (2019.01); *G06F 40/169* (2020.01); *G06F 40/284* (2020.01); *G06F 40/295* (2020.01); *G06N 5/02* (2013.01); *G06N 20/00* (2019.01)

(58) Field of Classification Search
CPC .... G06F 16/367; G06F 40/279; G06F 40/295; G06F 40/30; G06N 20/00

USPC .................. 707/722, 756, 738, 723; 715/230
See application file for complete search history.

(56) References Cited

U.S. PATENT DOCUMENTS

| | | | |
|---|---|---|---|
| 8,751,505 B2 | 6/2014 | Carmel et al. | |
| 8,805,845 B1* | 8/2014 | Li | G06F 17/30958 |
| | | | 707/738 |
| 8,880,564 B2 | 11/2014 | Jayadevan et al. | |
| 2003/0120640 A1* | 6/2003 | Ohta | G06F 19/28 |

(Continued)

OTHER PUBLICATIONS

Durrett et al., "A Joint Model for Entity Analysis: Coreference, Typing, and Linking", Transactions of the Association for Computational Linguisitics (TACL), 2014, pp. 1-14.

(Continued)

*Primary Examiner* — William Spieler
(74) *Attorney, Agent, or Firm* — James W. Kappos

(57) ABSTRACT

The present invention may be a method, a computer system, and/or a computer program product. An embodiment of the present invention provides a computer-implemented method for obtaining one or more candidates for a relationship type and its label. The method comprises the following steps: analyzing a document annotated with entity types, the analysis comprising counting the number of pairs of co-occurring entity types in each sentence in the document, and judging whether there exists, in the document, a candidate for a label of a relationship type which shows relationship between or among the co-occurring entity types and, if the judgment is positive, storing a candidate for the relationship type and a candidate for its label; and outputting a result of the analysis. The method may further comprise, if the judgment is negative, storing a candidate for the relationship type without a candidate for its label.

14 Claims, 12 Drawing Sheets

(56) References Cited

U.S. PATENT DOCUMENTS

| | | | |
|---|---|---|---|
| 2005/0027664 A1* | 2/2005 | Johnson | G06F 17/2827 706/12 |
| 2005/0108630 A1* | 5/2005 | Wasson | G06F 17/241 715/230 |
| 2010/0076923 A1* | 3/2010 | Hua | G06F 16/70 706/61 |
| 2010/0122220 A1* | 5/2010 | Ainsworth | G06F 17/30899 715/866 |
| 2011/0213742 A1* | 9/2011 | Lemmond | G06F 17/30684 706/13 |
| 2011/0282855 A1 | 11/2011 | Ronen et al. | |
| 2012/0078888 A1* | 3/2012 | Brown | G06F 17/30654 707/723 |
| 2013/0124545 A1* | 5/2013 | Holmberg | G06F 17/30244 707/756 |
| 2014/0082003 A1 | 3/2014 | Feldman et al. | |
| 2014/0244241 A1* | 8/2014 | Ghaisas | G06F 17/27 704/9 |
| 2016/0314123 A1* | 10/2016 | Ramachandran | G06F 16/24578 |
| 2016/0378869 A1* | 12/2016 | Nittka | G06F 17/3071 707/710 |

OTHER PUBLICATIONS

Voskarides et al., "Learning to Explain Entity Relationships in Knowledge Graphs", Proceedings of the 53rd Annual Meeting of the Association for Computational Linguistics and the 7th International Joint Conference on Natural Language Processing, Jul. 26-31, 2015, pp. 564-574, Beijing, China, Copyright 2015 Association for Computational Linguistics.

Ren et al., "ClusType: Effective Entity Recognition and Typing by Relation Phrase-Based Clustering", KDD '15, Aug. 10-13, 2015, pp. 1-10, Sydney, NSW, Australia, Copyright 2015 ACM. ISBN 978-1-4503-3664—Feb. 15, 2008.

Microsoft Data Developer Center, "Relationships/Associations with the EF Designer", Printed on Jan. 23, 2016, pp. 1-4, Copyright 2015 Microsoft, https://msdn.microsoft.com/en-us/data/jj713299.aspx.

* cited by examiner

Sentence #1
401

[PERSON] Thomas Edison was born on February [DATE] 11, 1847, in [LOCATION] Milan, [LOCATION] and grew up in Port Huron, Michigan.

Sentence #2
402

[PERSON] Thomas Edison died on October [DATE] 18, 1931, in [LOCATION] West Orange.

*FIG. 4*

OBTAINING CANDIDATES FOR A RELATIONSHIP TYPE AND ITS LABEL

BACKGROUND

The present invention generally to the field of machine learning, and more specifically, to obtaining of one or more candidates for a relationship type and its label.

Machine learning includes extracting some properties of a data set and applying them to new data. In order to create data set for machine learning, it is necessary to define entity types as well as a relationship type, which connects between or among entity types. Each definition of entity types and relationship types differs from domain to domain.

SUMMARY

According to one aspect of an embodiment of the present invention, the embodiment of the present invention provides a computer-implemented method for obtaining one or more candidates for a relationship type and its label. The method comprises the following steps: analyzing a document annotated with entity types, the analysis comprising counting the number of pairs of co-occurring entity types in each sentence in the document, and judging whether there exists, in the document, a candidate for a label of a relationship type which shows relationship between or among the co-occurring entity types and, if the judgment is positive, storing a candidate for the relationship type and a candidate for its label; and outputting a result of the analysis. The method may further comprise, if the judgment is negative, storing a candidate for the relationship type without a candidate for its label.

According to another aspect of an embodiment of the present invention, a computer system comprising a computer readable storage medium storing a program of instructions executable by the computer system to perform one or more methods described herein also may be provided.

According to another aspect of an embodiment of the present invention, a computer program product comprising a computer readable storage medium storing a program of instructions executable by the computer system to perform one or more methods described herein also may be provided.

BRIEF DESCRIPTION OF THE SEVERAL VIEWS OF THE DRAWINGS

FIG. 4 illustrates an embodiment of documents annotated with entity types.

DETAILED DESCRIPTION

Figure 1:
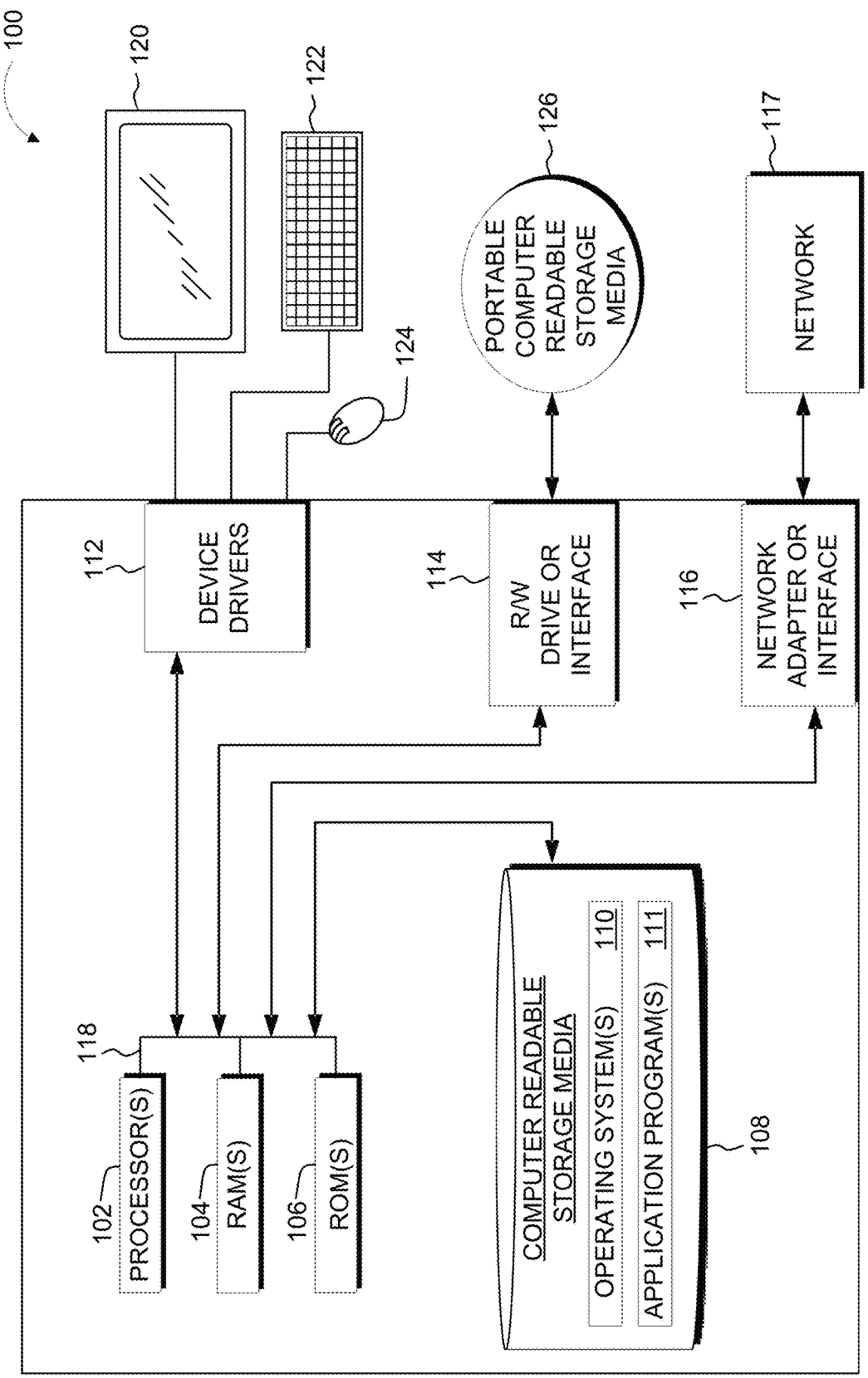
FIG. 1 illustrates an exemplified basic block diagram of a computer hardware used in an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 illustrates an exemplified basic block diagram of a computer 100 used in an embodiment of the present invention. It should be appreciated that FIG. 1 provides only an illustration of one implementation and does not imply any limitations with regard to the environments in which different embodiments may be implemented. Many modifications to the depicted environment may be made.

Computer 100 may include one or more processors 102, one or more computer-readable RAMs 104, one or more computer-readable ROMs 106, one or more computer readable storage media 108, device drivers 112, read/write drive or interface 114, network adapter or interface 116, all interconnected over a communications fabric 118. Communications fabric 118 may be implemented with any architecture designed for passing data and/or control information between processors (such as microprocessors, communications and network processors, etc.), system memory, peripheral devices, and any other hardware components within a system.

One or more operating systems 110, and one or more application programs 111, are stored on one or more of the computer readable storage media 108 for execution by one or more of the processors 102 via one or more of the respective RAMs 104 (which typically include cache memory). In the illustrated embodiment, each of the computer readable storage media 108 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computer 100 may also include a R/W drive or interface 114 to read from and write to one or more portable computer readable storage media 126. Application programs 111 on computer 100 may be stored on one or more of the portable computer readable storage media 126, read via the respective R/W drive or interface 114 and loaded into the respective computer readable storage media 108.

Computer 100 may also include a network adapter or interface 116, such as a TCP/IP adapter card or wireless communication adapter (such as a 4G wireless communication adapter using OFDMA technology) for connection to a network 117. Application programs 111 on computer 100 may be downloaded to the computing device from an external computer or external storage device via a network (for example, the Internet, a local area network or other wide area network or wireless network) and network adapter or interface 116. From the network adapter or interface 716, the programs may be loaded onto computer readable storage media 708. The network may comprise copper wires, optical fibers, wireless transmission, routers, firewalls, switches, gateway computers and/or edge servers.

Computer 100 may also include a display screen 120, a keyboard or keypad 122, and a computer mouse or touchpad 124. Device drivers 112 interface to display screen 120 for imaging, to keyboard or keypad 122, to computer mouse or touchpad 124, and/or to display screen 120 for pressure sensing of alphanumeric character entry and user selections. The device drivers 112, R/W drive or interface 114 and network adapter or interface 116 may comprise hardware and software (stored on computer readable storage media 108 and/or ROM 106).

Figure 3:
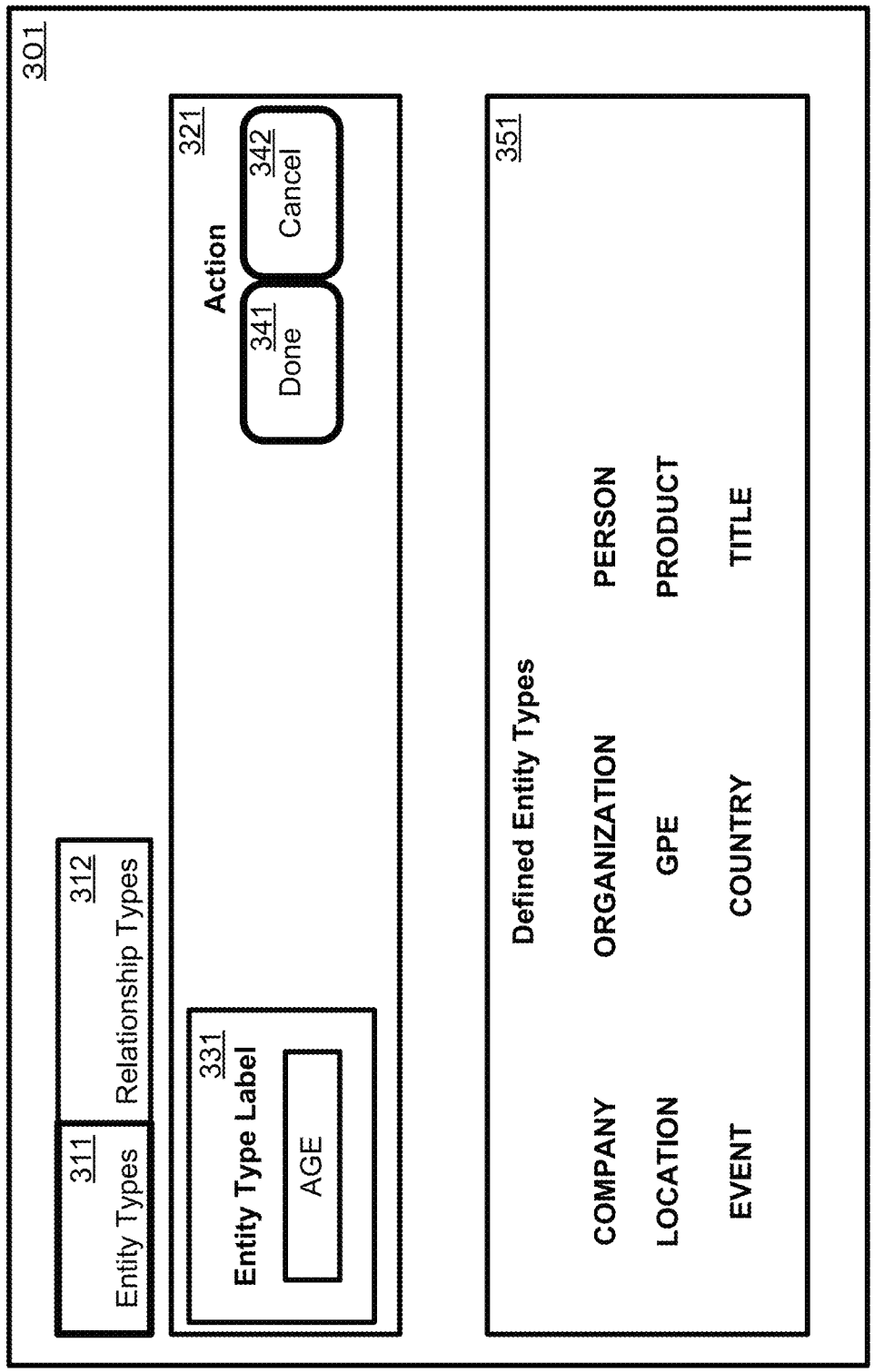
FIG. 3 illustrates an embodiment of a user interface for defining an entity type label and showing the defined entity types.
Figure 6:
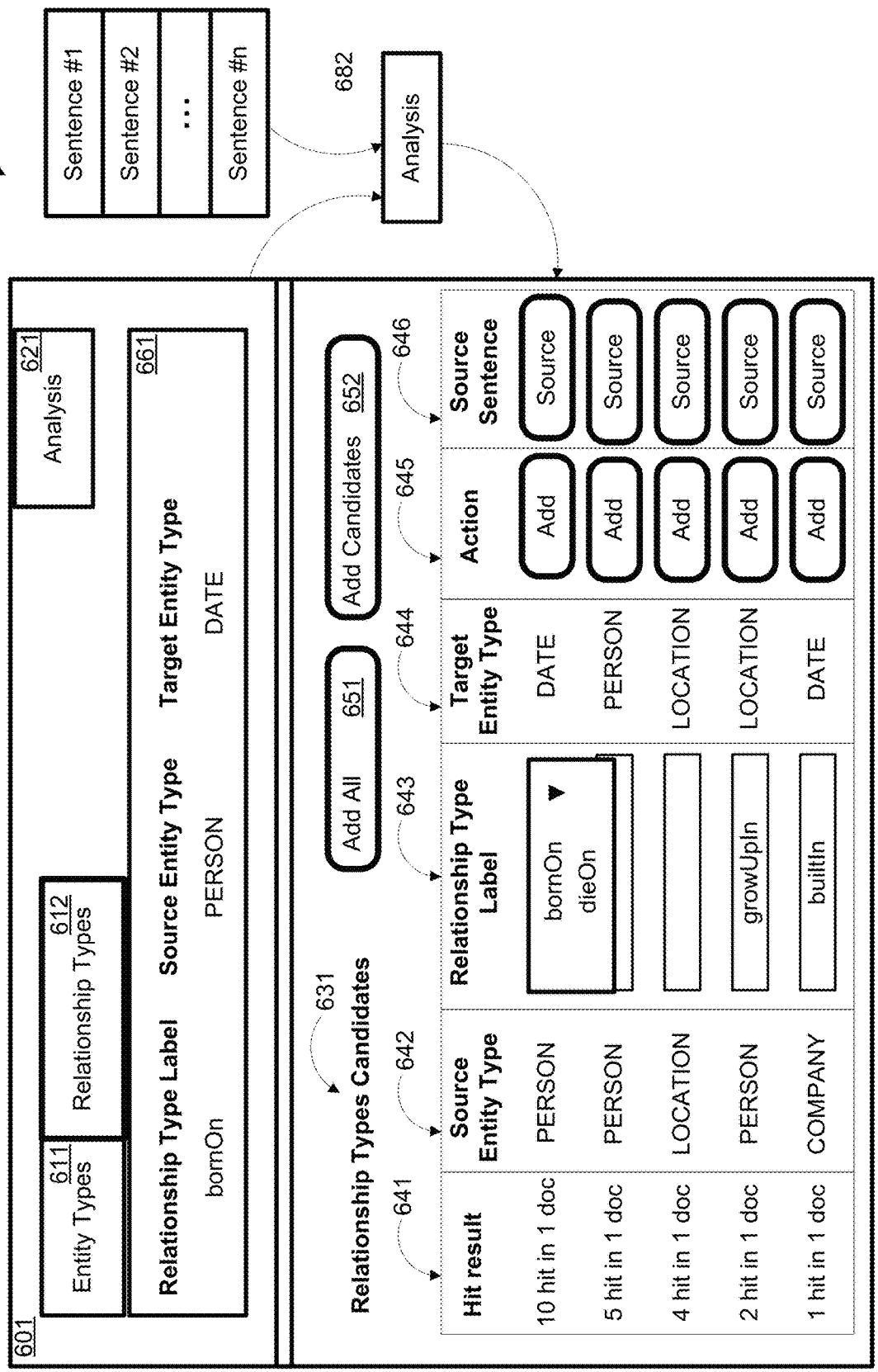
FIG. 6 illustrates an embodiment of a user interface for editing one or more candidates for a relationship type and its label and for editing a relationship type label.

Prior to explaining an embodiment of the present invention, an entity type and a relationship type will be first explained below by referring to FIG. 9 mentioned below. An entity type and a relationship type are used for creating a data set, which is used for machine learning. The term "entity type" may refer to a definition for annotating a word or phrase in a document. Examples of entity type are shown in FIG. 3 mentioned below. The term "a relationship type" may refer to an association between or among entity types. The number of entity types relating to the association may be two or more. A relationship type may also be referred to as an entity-relationship type. Examples of relationship types are shown in FIGS. 6 and 7 is discussed in further detail below.

Figure 9:
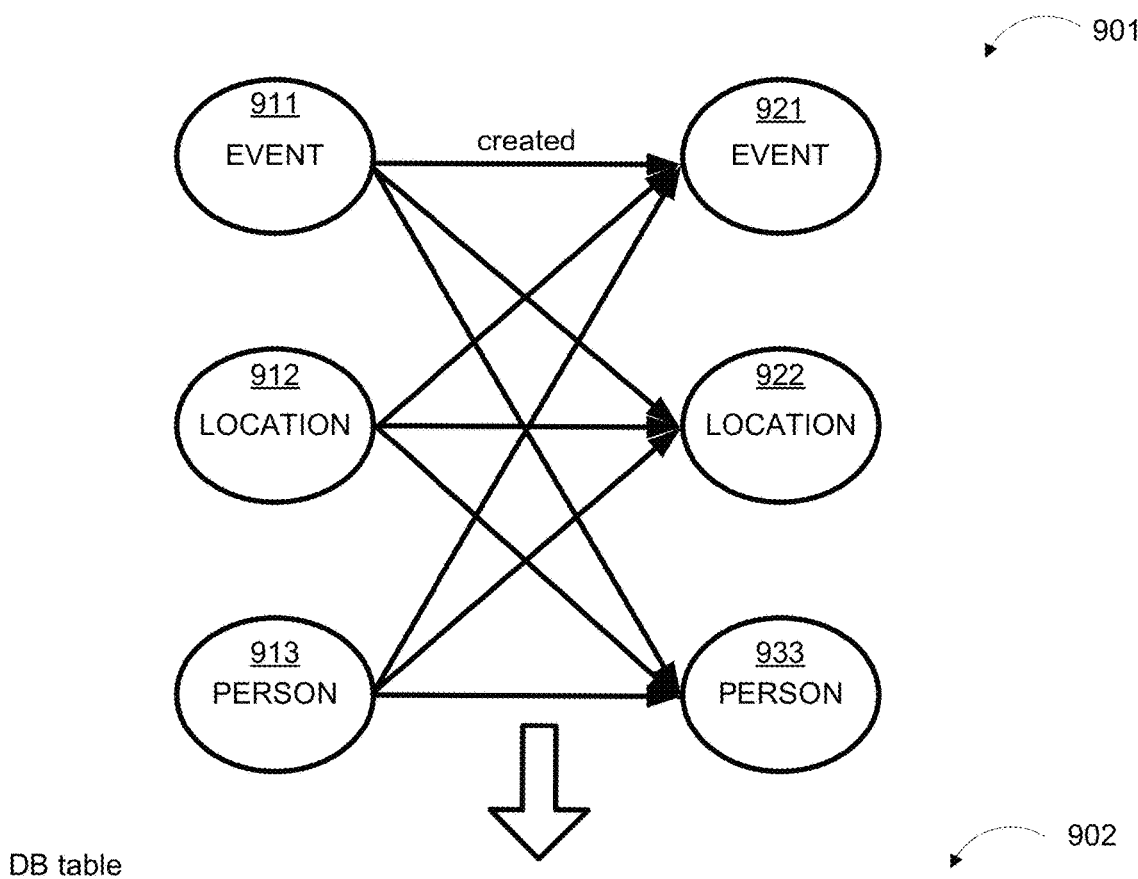
FIG. 9 illustrates an exemplary embodiment of entity types and relationship types.

With reference now to FIG. 9, FIG. 9 illustrates an exemplary embodiment of entity types and relationship types. FIG. 9, relationship graph 901, illustrates three source entity types 911, 912 and 913, three target entity types 921, 922 and 923 and relationship types between the source entity and the target entity.

Each label of the source entities 911, 912 and 913 is "EVENT", "LOCATION" and "PERSON", respectively. Each label of the target entities 921, 922 and 923 is "EVENT", "LOCATION" and "PERSON", respectively.

All labels of the relationship types between possible combination of the source entity types and target entity types are "created".

The number of relationship types is calculated by a square (N*N') of the number, N, of source entity types and the number, N', of target entity types. Accordingly, when there are three source entity types 911, 912 and 913 and three target entity types 921, 922 and 923, three nine-relationship types having the same label, "created", are defined, as seen in the structure shown in the relationship graph 901.

In various embodiments, if 50 source entity types and 50 target entity types are defined, there are up to 2,500 definitions of relationship types having the same label. Accordingly, the number of relationship type definition increases according to the number of source entity types and the number of target entity types.

FIG. 9, database table 902, illustrates a database (DB) table including sets of identification number of a relationship type between a source entity type and a target entity type, a label of the relationship type, a source entity type, "srcEntityType", and a target entity type, "tgtEntityType".

A definition of a relationship type between or among entity types differs from domain to domain. Accordingly, it is required to create a definition of a relationship type prior to the start of machine learning. Further, it is required to add, edit or delete a definition of a relationship type prior to start machine leaning, because a definition of a relationship differs in each domain.

Figure 2A:
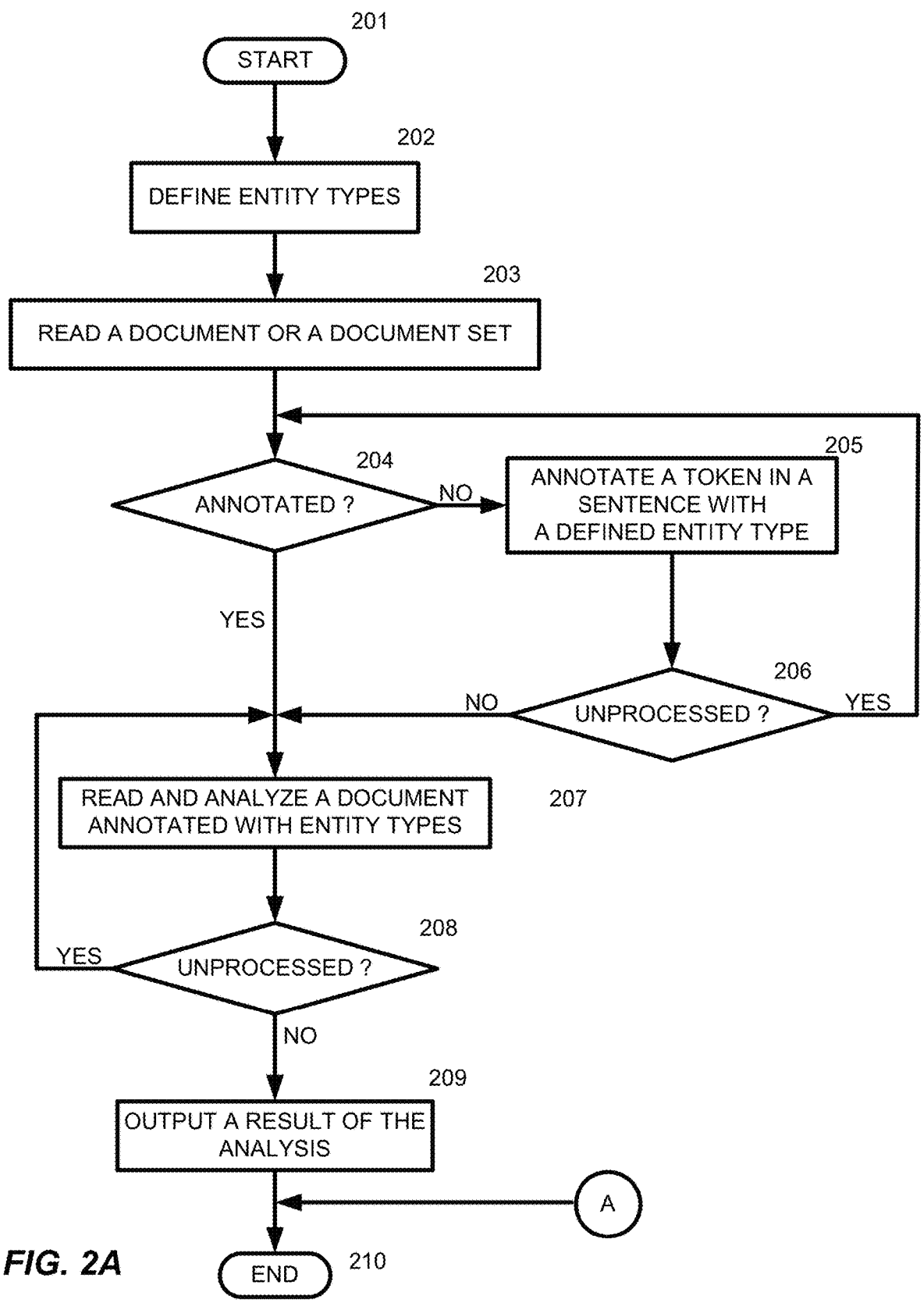
FIGS. 2A and 2B illustrate an embodiment of a flowchart of a process for obtaining one or more candidates for a relationship type and its label.
Figure 2B:
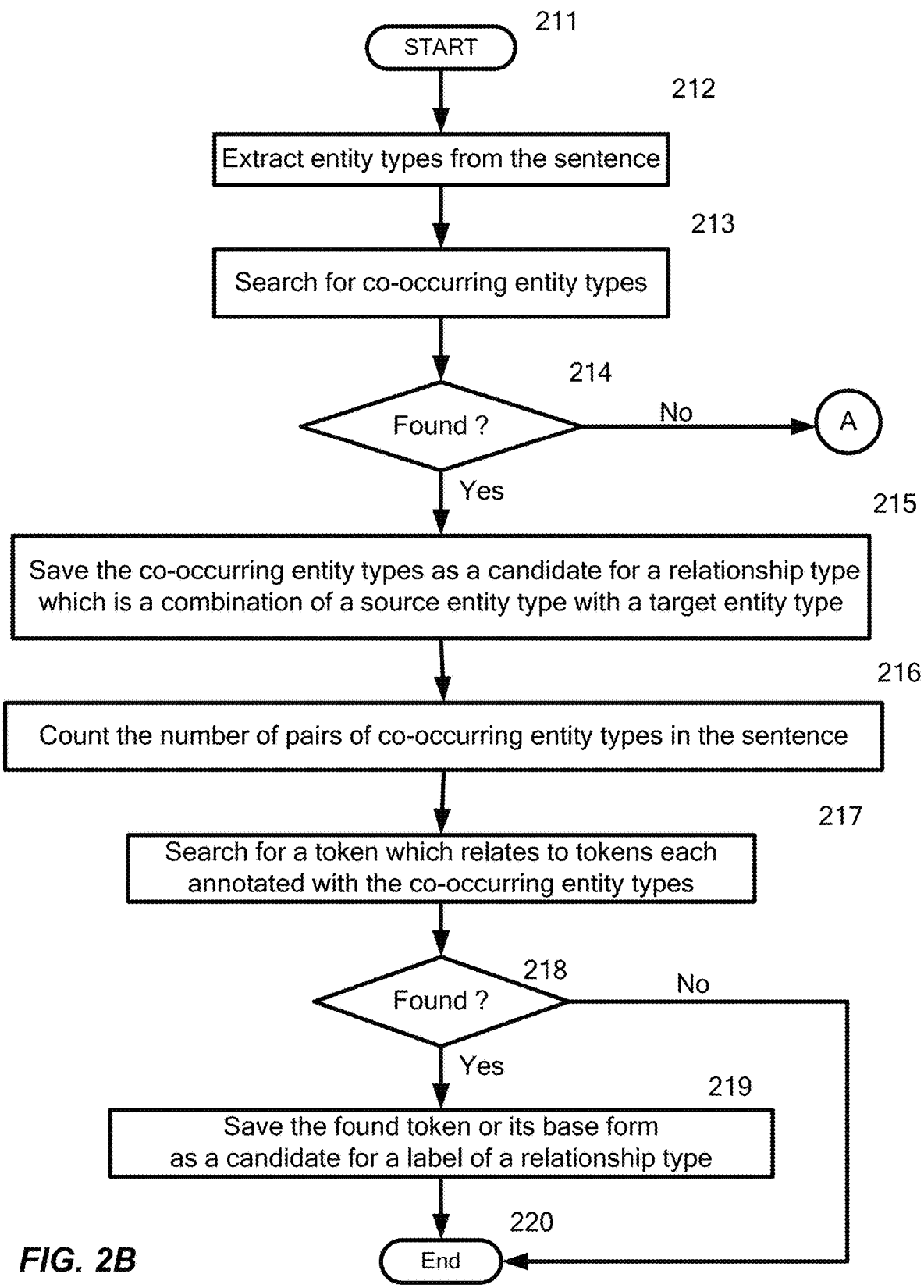

FIGS. 2A and 2B illustrate an embodiment of a flowchart of a process for obtaining one or more candidates for a relationship type and its label.

With reference now to FIG. 2A, FIG. 2A illustrates an embodiment of a basic flowchart of the process.

A system such as the computer 100 performs each process described in FIGS. 2A and 2B. The system may be implemented as a single computer or plural computers. In step 201, the system starts the process described above. In step 202, the system shows a user interface for defining an entity type. An example of the user interface for defining or editing an entity type will be shown in FIG. 3, described in more detail below. The user can define entity type through the user interface. The defined entity type will be used for an embodiment of the present invention. Further, the defined entity type may be used for machine learning. A variety of entity types can be defined according to a domain or field to which the document or document set belongs. In response to the input of entity type by the user, the system stores the input entity type into a storage, such as a storage media 108 described in FIG. 1.

In step 203, the system reads, into a memory, such as a RAM 104 described in FIG. 1, a document or a document set from a storage, such as a storage media 108 described in FIG. 1. The document or document set is one used for machine learning. In step 204, the system takes one sentence from the document or document set and then judges whether the sentence is annotated with a defined entity type or not. If the judgment is positive, the system proceeds to step 207 without an annotating process performed in step 205. If the judgment is negative, the system proceeds to step 205. In step 205, the system extracts a token from the sentence and then annotates the extracted token with the defined entity type. The token may be for example, but not limited to, a noun or noun phrase.

The annotation may be carried out by one or combination of the following methods:

a) an annotation is automatically carried out using a dictionary or rules, where the dictionary or rules are prepared or provided according to a domain or field to which the document or document set belongs;

b) an annotation is automatically carried out using a model which is trained by machine learning, where the model are prepared or provided according to a domain or field to which the document or document set belongs; and c) an annotation is manually carried out (this may be also referred to as "human annotation").

As a result of the step 205, the document annotated with entity types is obtained. The document annotated with entity types refers to a document including at least one sentence with which at least one entity type is annotated. In step 206, the system judges whether there remains unprocessed sentence or not. If the judgment is positive, the system proceeds back to step 204 to repeat step 204 and, if required, steps 205 and 206. If the judgment is negative, the system proceeds to step 207. The steps 204 and, if the judgment is positive, steps 205 to 206 will be repeated until all sentences are processed. After then, a document or documents annotated with entity type will be obtained. Examples of the document annotated with entity types are illustrated in FIG. 4 described in more detail below.

In step 207, the system reads one document annotated with entity types and then analyzes the document. The details of step 207 will be described in more detail below by referring to FIG. 2B.

With reference now to FIG. 2B, in step 211, the system starts the process for analyzes the document. In step 212, the system extracts entity types from the sentence. In step 213, the system searches for co-occurring entity types. A parser for analyzing a document written in a specific language may be used for searching for co-occurring entity types. Any method known in the art for finding co-occurring entity types can be used. In step 214, the system judges whether the co-occurring entity types was found or not. If the judgment is positive, the system proceeds to step 215. If the judgment is negative, the system proceeds to a final step 210 described in FIG. 2A. In step 215, the system saves the co-occurring entity types as a candidate for a relationship type, which is a combination of a source entity type with a target entity type. The system may extract the co-occurring entity types, using a method known in the art. The co-occurring entity types may be of a combination of a source entity type with a target entity type.

In step 216, the system counts the number of pairs of co-occurring entity types in the sentence, document, document set or combination thereof. The count may be carried out by counting the number of the same pairs of the co-occurring entity types or the number of the candidates for the relationship type, which has same label, and same pairs of co-occurring entity types.

Further, the system may count the number of places where the same label of a candidate for the relationship type has as a result of parsing the sentence. The result may be obtained, for example, using a parse server. This counting enables a user to select one label candidate among plurality of label candidates for a relationship type.

In step 217, the system searches for a token, which relates to tokens each annotated with the co-occurring entity types or its base form. The token, which relates to tokens each annotated with the co-occurring entity types may be a candidate for a label of a relationship type. The token as the candidate may be obtained by parsing the sentence. The token as the candidate may be for example, but not limited to, a verb, or a combination of a verb with a preposition, adverb or adjective. The base form may be a modified version of the found token in the sentence. The modified version may refer to a base form or dictionary listed form of the found token in the sentence. If the found token is a past form of a verb, the modified version is a present form corresponding to the past form.

In step 218, the system judges whether the token which relates to tokens each annotated with the co-occurring entity types was found or not. If the judgment is positive, the system proceeds to step 219. If the judgment is negative, the system proceeds to a final step 220. In step 219, the system saves the found token or its base form as a candidate for a label of a relationship type. In step 220, the system terminates the process for analyzing the document and then proceeds to step 208 described in FIG. 2A. With reference now back to FIG. 2A, in step 208, the system judges whether there remains unprocessed document or not. If the judgment is positive, the system proceeds back to step 207 to repeat steps 207 and 208. If the judgment is negative, the system proceeds to step 209. In step 209, the system outputs a result of the analysis obtained in step 207. The result of the analysis may be based on the analysis result.

According to the steps 215 and 219, if there is no candidate, in the document, for a label of a relationship type which shows relationship between or among the co-occurring entity type, a candidate for the relationship type is only stored without a candidate for its label. Accordingly, the result may comprise the co-occurring entity types and the number of the pairs of co-occurring entity types. The number of the pairs of co-occurring entity types may be the number of the same pairs of co-occurring entity types.

In contrast, according to the steps 215 and 219, if there exists, in the document, a candidate for a label of a relationship type, which shows relationship between, or among the co-occurring entity types, a candidate for the relationship type and a candidate for its label are stored. Accordingly, the result may comprise the co-occurring entity types and the number of the pairs of co-occurring entity types as well as the one or more candidates for a relationship type and its label. The number of the pairs of co-occurring entity types may be the number of the same pairs of co-occurring entity types or the number of the candidates for the relationship type, which has same label, and same pairs of co-occurring entity types.

The co-occurring entity types may be sorted, based on the number of pairs of co-occurring entity types, and the sorted result may be output, for example, as a list. The system may display the sorted result on a display or print out the sorted result. The candidate of a label of a relationship type will be used for editing the label by a user, as it will be described on more detail below by referring to FIGS. 5 and 7. An editor may allow a user to edit a label of a relationship type, which is selected among the candidate for its label. Further, the editor may enable a user to input a label of the relationship type between or among co-occurring entity types if there is no label candidate of the relationship type.

With reference now to FIG. 3, FIG. 3 illustrates an embodiment of a user interface for defining an entity type and its label and showing the defined entity types.

The user interface 301 has two buttons of selecting a menu of "Entity Types" 311 or a menu of "Relationship Types" 312.

Let us suppose that the buttons of selecting the menu of "Entity Types" 311 is selected. In response to the selection of the menu of "Entity Types" 311, an editor for defining an entity type and its label is launched.

The user can define or input an entity type label 331 through a window 321. The entity type label, "AGE", is now input by a user. If the user hopes to save the entity type label, "AGE", he or she presses a button, "Done" 341. If the user hopes to stop the entity type label, "AGE", he or she presses a button, "Cancel" 342.

The user interface 301 has a window 351 which shows the following defined entity types: "COMPANY", "ORGANIZATION", "PERSON", "LOCATION", "GPE", "PRODUCT", "EVENT", "COUNTRY", and "TITLE". For reference, the term, "GPE", is an abbreviation of "Geopolitical Entities".

Figure 5:
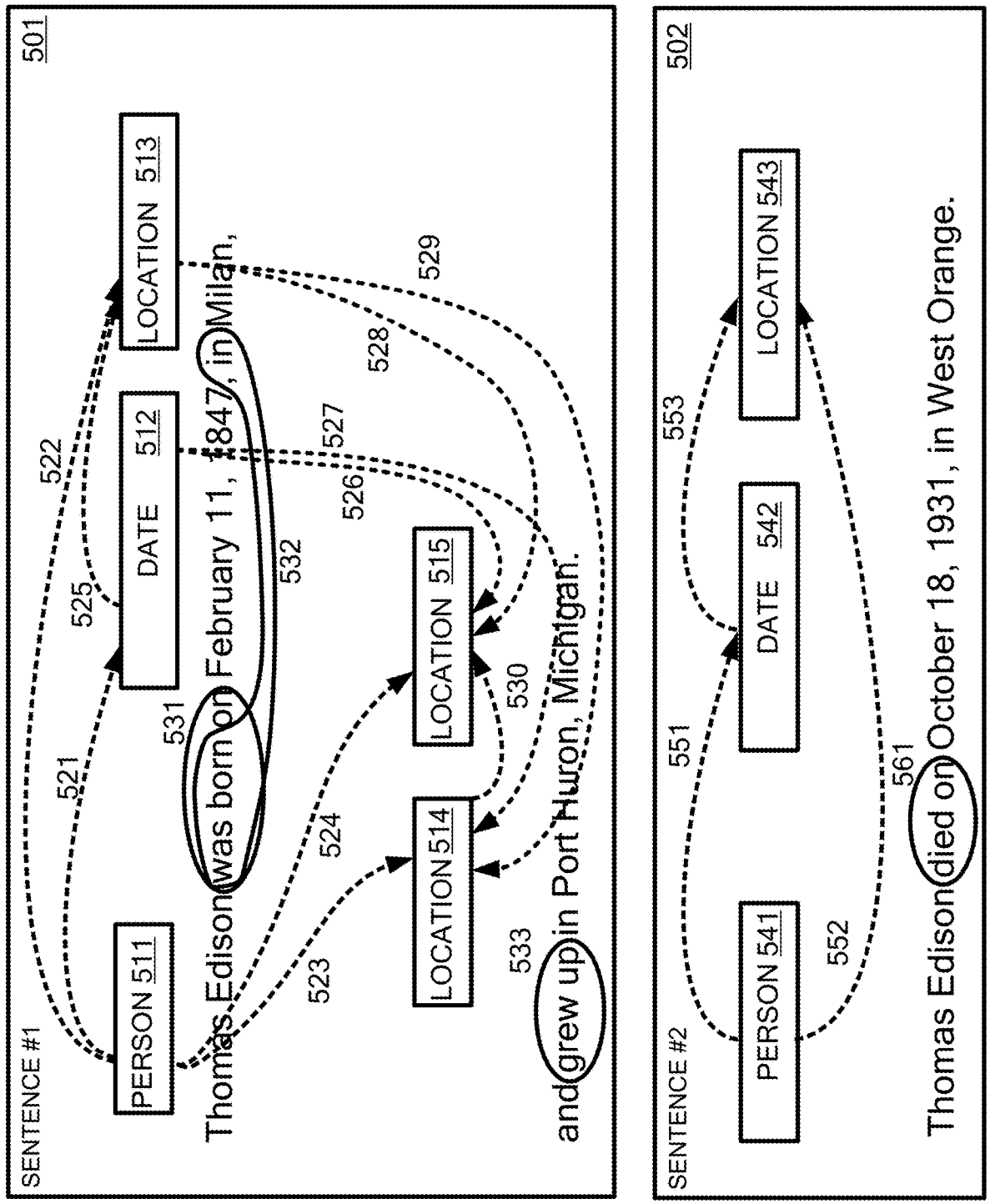
FIG. 5 illustrates an embodiment of relationship types between the co-occurring entity types.

FIGS. 4 and 5 illustrate an embodiment of documents used in an embodiment of the present invention.

With reference now to FIG. 4, FIG. 4 illustrates an embodiment of documents annotated with entity types. FIG. 4 illustrates two sentences: Sentence #1 401 and Sentence #2 402 with which entity types are annotated. Sentence #1 401 is the following: "Thomas Edison was born on Feb. 11, 1847, in Milan, and grew up in Port Huron, Mich." The entity type, "PERSON", is annotated with a term, "Thomas Edison". The entity type, "DATE", is annotated with a term, "Feb. 11, 1847". The entity type, "LOCATION", is annotated with a term, "Milan". The entity type, "LOCATION", is annotated with a term, "Port Huron". The entity type, "LOCATION", is annotated with a term, "Michigan".

Sentence #2 402 is the following: "Thomas Edison died on Oct. 18, 1931, in West Orange." The entity type, "PERSON", is annotated with a term, "Thomas Edison". The entity type, "DATE", is annotated with a term, "Oct. 18, 1931". The entity type, "LOCATION", is annotated with a term, "West Orange". The entity types were annotated according to the step 205 described in FIG. 2A.

With reference now to FIG. 5, FIG. 5 illustrates an embodiment of relationship type between the co-occurring entity types. FIG. 5 illustrates two sentences: Sentence #1 501 and Sentence #2 502 with which entity types are annotated, which sentences are the same those described in FIG. 4, Sentence #1 401 and Sentence #2 402, respectively.

Sentence #1 501 is the following: "Thomas Edison was born on Feb. 11, 1847, in Milan, and grew up in Port Huron, Michigan". Each entity types annotated with Sentence #1 (501) is the same as that described in FIG. 4, Sentence #1 401.

The entity type, "PERSON" 511, has each co-occurring relationship 521, 522, 523 and 524) with the entity type, "DATE" 512,"LOCATION" 513, "LOCATION" 514 and "LOCATION" 515, respectively.

Sentence #2 402 is the following: "Thomas Edison died on Oct. 18, 1931, in West Orange." The entity type, "PERSON", is annotated with a term, "Thomas Edison". The entity type, "DATE", is annotated with a term, "Oct. 18, 1931". The entity type, "LOCATION", is annotated with a term, "West Orange". The entity types were annotated according to the step 205 described in FIG. 2A.

With reference now to FIG. 5, FIG. 5 illustrates an embodiment of relationship type between the co-occurring entity types. FIG. 5 illustrates two sentences: Sentence #1 501 and Sentence #2 502 with which entity types are annotated, which sentences are the same those described in FIG. 4, Sentence #1 401 and Sentence #2 402, respectively.

Sentence #1 501 is the following: "Thomas Edison was born on Feb. 11, 1847, in Milan, and grew up in Port Huron, Michigan". Each entity types annotated with Sentence #1 (501) is the same as that described in FIG. 4, Sentence #1 401.

The entity type, "PERSON" 511, has each co-occurring relationship 521, 522, 523 and 524) with the entity type, "DATE" 512,"LOCATION" 513, "LOCATION" 514 and "LOCATION" 515, respectively.

In Sentence #1 501, the number of pairs of co-occurring entity types is as follows:
  the number of pairs of co-occurring entity types "3": "Person" and "Location";
  the number of pairs of co-occurring entity types "3"; "LOCATION" and "LOCATION",
  the number of pairs of co-occurring entity types "3": "Date" and "Location"; and
  the number of pairs of co-occurring entity types "1": "Person" and "Date".

Further, the ratio of the number of pairs of co-occurring entity types to the total number of pairs of co-occurring entity types may be calculated based on the calculated numbers of pairs of co-occurring entity types.

Sentence #2 502 is the following: "Thomas Edison died on Oct. 18, 1931, in West Orange.". Each entity types annotated with Sentence #2 502 is the same as that described in FIG. 4, Sentence #2 402.

The entity type, "PERSON" 641, has each co-occurring relationship 551 and 552 with the entity type, "DATE" 542 and "LOCATION" 543, respectively.

The entity type, "DATE" 542 has co-occurring relationship 543 with the entity type, "LOCATION" 543.

The token, "died on" 561, is a verb with a preposition and located between the co-occurring entity types, i.e. the source entity type, "PERSON" 541, and the target entity type, "DATE" 543. Accordingly, the token, "died on" 561, can be a candidate for a label of a relationship type.

With reference now to FIG. 6, FIG. 6 illustrates an embodiment of a user interface for obtaining one or more candidates for a relationship type and its label and for editing a relationship type and its label.

The user interface 601 has two buttons of selecting a menu of "Entity Types" 611 or a menu of "Relationship Types" 612, which buttons are the same as those described in FIG. 3.

Let us suppose that the buttons of selecting the menu of "Relationship Types" 612 is selected. In response to the selection of the menu of "Relationship Types" 612, an editor for editing a relationship type and its label is launched.

In response to the press of a analysis button 621, the system reads a document 681 comprising sentences #1, #2, . . . #n, where n is a positive integer and then takes one sentence from the document 681. Next, if the sentence is not annotated with a defined entity type, the system extracts a token from the sentence and then annotates the extracted token with the defined entity type to obtain the document annotated with entity types. Finally, the system reads one document annotated with entity types and then analyzes 682 the document, according to the process described in FIG. 2B. The analysis result will be shown in the user interface 601.

The analysis result comprises candidates 631 for labels of each of the relationship type.

The hit result 641 may show the number of the pairs of co-occurring entity types in one document or document set, or the number of the same pairs of co-occurring entity types in one document or document set, or the number of the candidates for the relationship type which has same label and same pairs of co-occurring entity types. Alternatively, the hit result 641 may show the ratio of the number of pairs of co-occurring entity types to the total number of pairs of co-occurring entity types in one document or document set, or the ratio of the number of the same pairs of co-occurring entity types to the total number of pairs of co-occurring entity types in one document or document set in one document or document set or the ratio of the number of the candidates for the relationship type which has same label and same pairs of co-occurring entity types to the total number of pairs of co-occurring entity types in one document or document set in one document or document set.

The source entity type 642 shows a label of the source entity type in the same pairs of the co-occurring entity types.

The relationship type label 643 shows a label of the relationship type between the co-occurring entity types, i.e. the source entity type 642 and the target entity type 644.

The target entity type 644 shows a label of the target entity type in the same pairs of the co-occurring entity types.

The action button, "Add" 645, is used for saving the same pairs of the co-occurring entity types and a label of the relationship type having the same label, which the same pairs and the relationship type are written in a line.

The source-sentence button, "Source" 646, is used for displaying a source sentence which comprises the source entity type and the target entity type. If a relation type label is blank, the user click the source-sentence button, "Source" 646, the sentence is displayed on a window which may be a pop-window. The user can select, as a relationship type, a token in the displayed sentence. In response to the selection the token, the selected token is displayed in the relationship type label 643.

The button, "Add All" 651, is used for saving all candidates obtained.

The button, "Add Candidates" 652, is used for saving candidates having a high-ranking candidates based in the degree of certainly obtained from analysis results.

If a user selects "bornOn" among two candidates, i.e. "bornOn" and "dieOn", of relationship type labels and then the action button, "Add" 645, for the first line is clicked by the user, the label of the relationship type and the pair of the source entity type and the target entity type in the first line is stored into a storage, such as a storage media 108 described in FIG. 1. In response to the clicking of the action button, "Add" 645, the stored result will be shown in a window 661.

After storing the label of the relationship type and the pair of the source entity type and the target entity type in the first line into a storage, an editor for editing a relationship type label can allow a user to edit the label of the relationship type, the label of the source entity type and the label of target entity type.

Figure 7A:
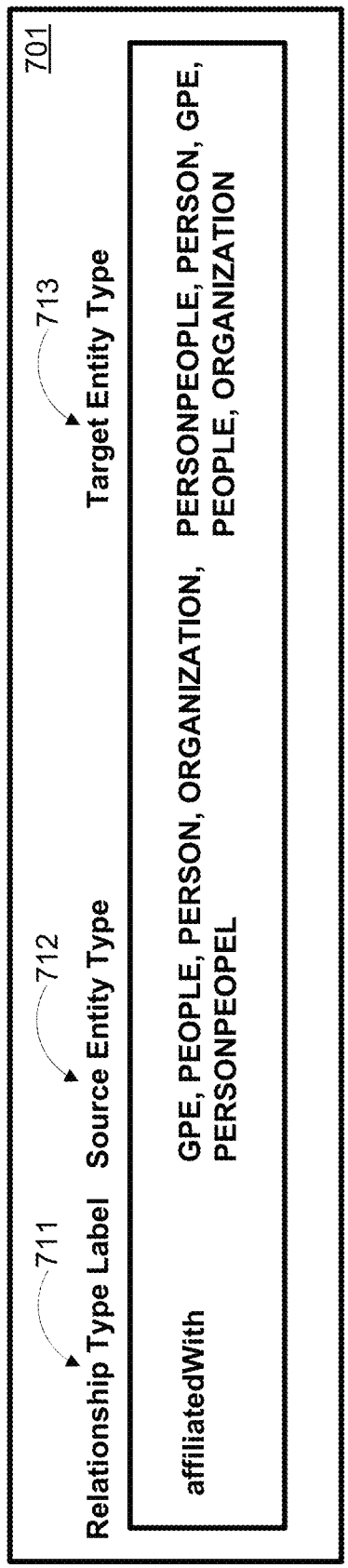
FIG. 7A illustrates an embodiment of a user interface for showing or editing a relationship type.
Figure 7B:
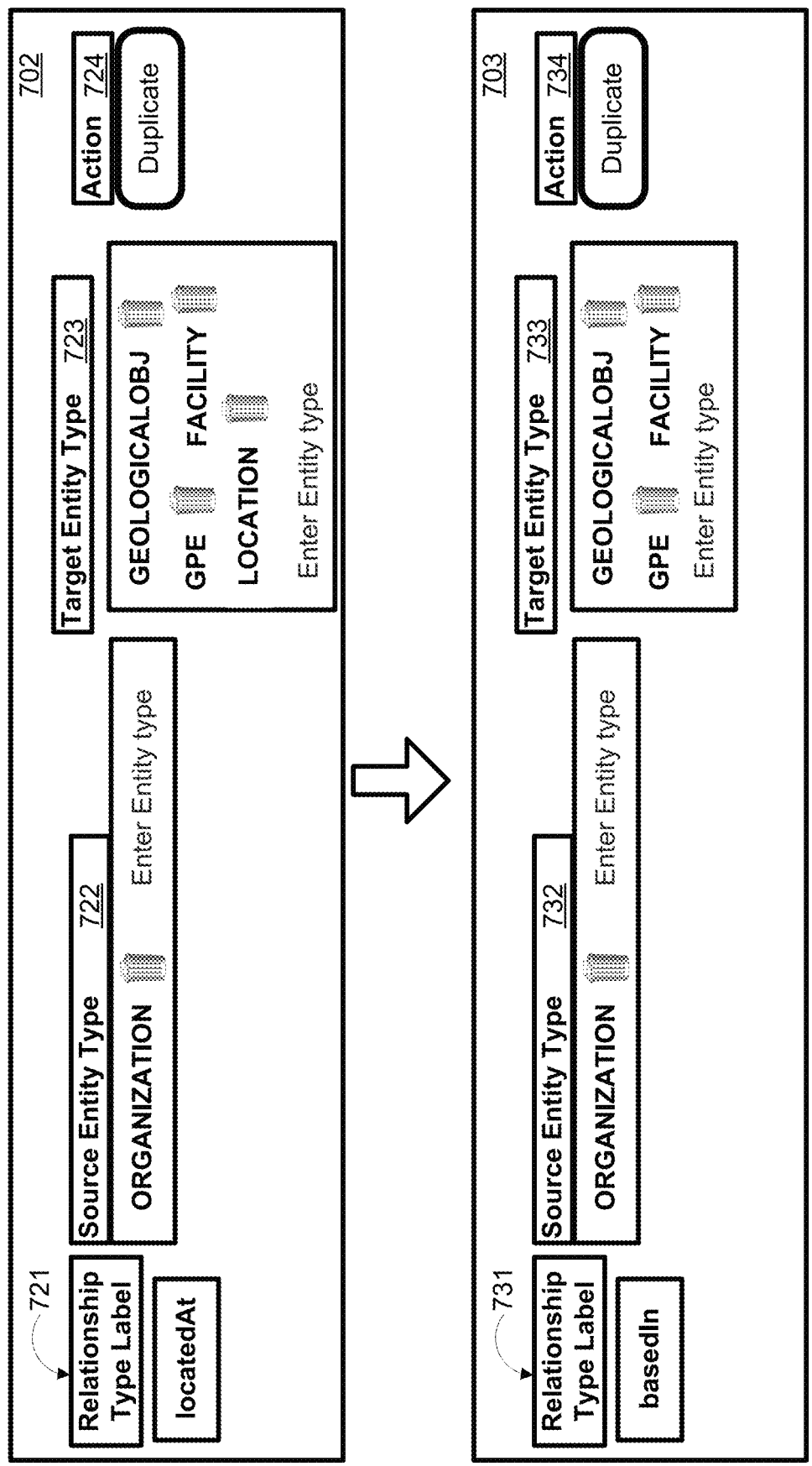
FIG. 7B illustrates an embodiment of a user interface for editing a relationship type label.

FIGS. 7A and 7B illustrate embodiments of a user interface for an editor. The editor assists a user to edit a relationship type and its label.

With reference now to FIG. 7A, FIG. 7A illustrates an embodiment of a user interface for showing or editing a relationship type and its label.

FIG. 7A illustrates an example of a user interface 701 for showing or editing a relationship type label. The user interface 701 may be displayed in the editor.

The user interface 701 shows the relationship type label, "affiliatedWith" 711. A relationship type is made up of a pair of a source entity type and a target entity type. When the same label of the relationship type is used for different pairs of a source type and a target type, the displaying of each of the source type and the target type is made by merging in each the same label of the relationship type. The user interface 701 shows that the relationship type "affiliatedWith" is displayed on a single line as a result of merging twenty five pairs of possible combinations of five source entity types 712 and five target entity types 713.

With reference now to FIG. 7B, FIG. 7B illustrates an embodiment of a user interface for editing a relationship type.

The user interface 702 shows an action button 724 for duplicating a line. The line shows a label of relationship type 721 between the source entity type 722 and the target entity type 723. When a user wishes to duplicate the line, a user may click the action button 724 to duplicate the line. In response to clicking of the action button 724, the line will be duplicated. The relationship type label of the duplicated line can be changed by a user, and the source entity type and the target entity type can be edited and then saved.

The user interface 703 shows a relationship type label of the duplicated line after changing the relationship type label of the duplicated line. The relationship type label was changed from "locatedAt" to "basedIn". Further, the target entity type, "LOCATION", was deleted by the user in the user interface 703.

Figure 7C:
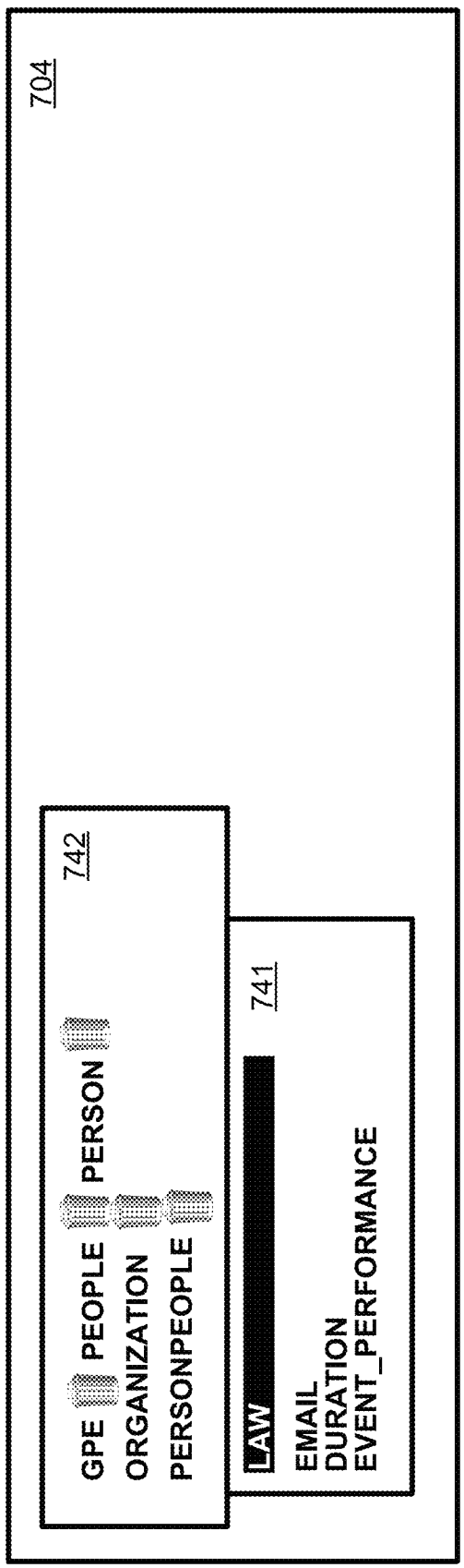
FIG. 7C illustrates an embodiment of a user interface for editing a source and target entity type.

With reference now to FIG. 7C, FIG. 7C illustrates an embodiment of a user interface for editing a source and target entity type.

The user interface 704 shows a list 741 of source (or target) entity types which will be used for adding or deleting a source (or target) entity type(s) which was already defined. The user interface 704 has two windows: a window 741 for showing the list and a window 742 for showing an entity type(s) which was already defined. The window 741 is shown as a type-head for enabling a user to add a source (or target) entity type(s). The user can select an entity type as a source (or target) entity type(s) from the list in the window 741.

Figure 8:
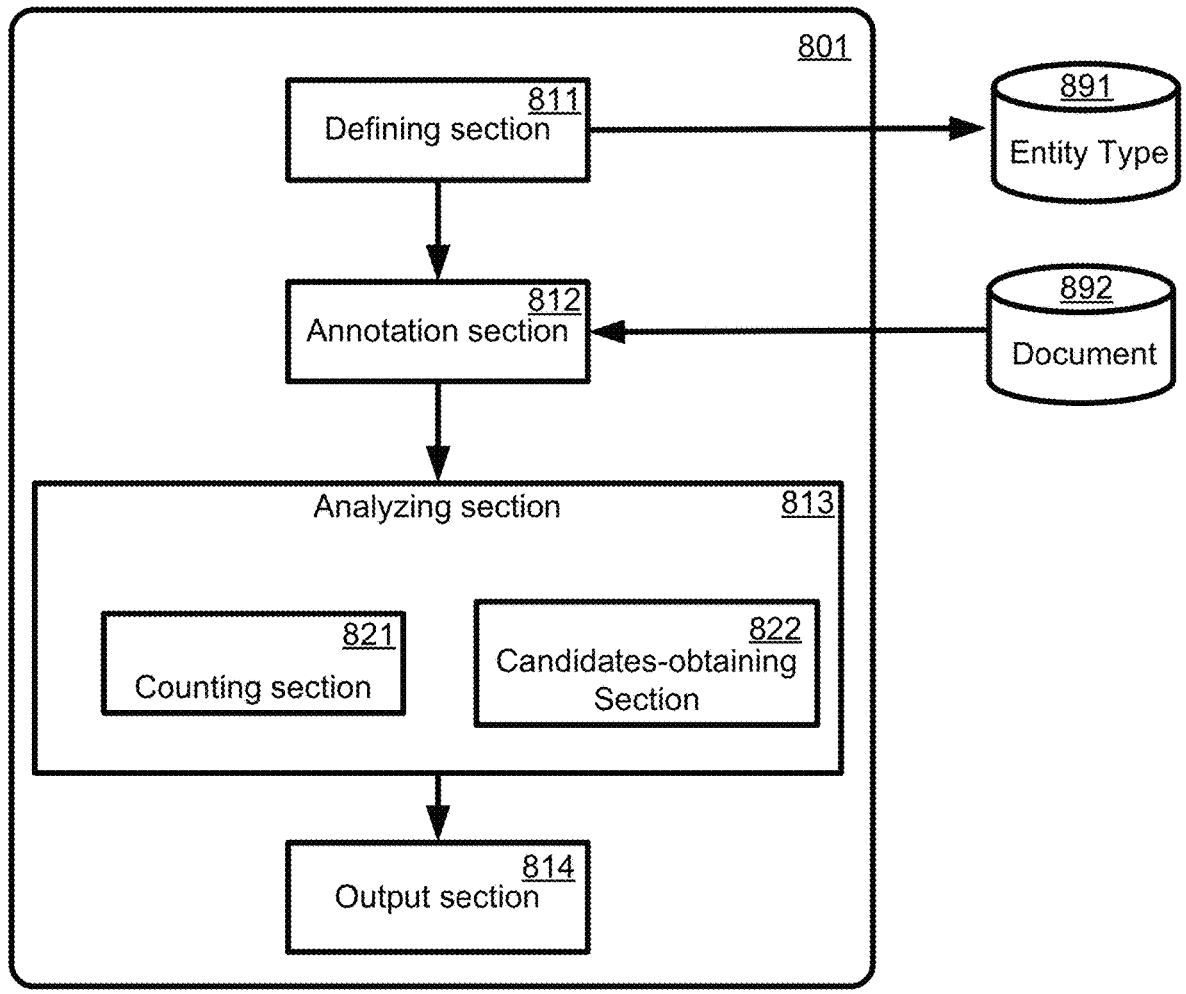
FIG. 8 illustrates one embodiment of an overall functional block diagram of a system hardware used in an embodiment of the present invention.

With reference now to FIG. 8, FIG. 8 illustrates one embodiment of an overall functional block diagram of a system hardware used in an embodiment of the flowchart described in FIGS. 2A and 2B.

The system 801 may correspond to the computer 100 described in FIG. 1.

The system 801 comprises a defining section 811, an annotation section 812, an analyzing section 813, and an output section 814.

The defining section 811 may perform step 202 described in FIG. 2A.

The annotation section 812 may perform steps 203 to 206 described in FIG. 2A.

The analyzing section 813 analyzes a document annotated with entity types. The analyzing section 813 counts the number of pairs of co-occurring entity types in each sentence in the document. The analyzing section 813 judges whether there exists, in the document, a candidate for a label of a relationship type, which shows relationship between or among the co-occurring entity types. If the judgment is positive, the analyzing section 813 may store a candidate for the relationship type and a candidate for its label.

The analyzing section 813 may perform steps 207 to 208 described in FIG. 2A and all steps described in FIG. 2B.

The output section 814 outputs a result of the analysis. The output section 814 may enable a user to select a relationship type among the candidate for its label and then enable the user to edit a label of the selected relationship type. The output section 814 may enable a user to input a label of the relationship type between or among co-occurring entity types if there is no label candidate of the relationship type.

The output section 814 may perform step 209 described in FIG. 2A.

It should be appreciated that by the expression "a/one" should be understood as "at least one"; the expression "comprise(s)/comprising a/one" should be understood as "comprise(s)/comprising at least one", the expression "comprise(s)/comprising" should be understood as "comprise(s)/comprising at least", and the expression "/" should be understood as "and/or".

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer-implemented method for using one or more candidates for a relationship type and its labels in a first machine learning process, the method comprising:
    collecting on one or more processors a document annotated with entity types,
    analyzing on one or more servers the document annotated with entity types, wherein an entity type comprises a definition for annotating a word or phrase in a document, and wherein annotating a word or phrase in the document is automatically carried out using a model trained by a second machine learning process, the analysis comprising:
        counting the number of pairs of co-occurring entity types in each sentence in the document; and
        judging whether there exists, in the document, a candidate for a label of a relationship type which shows a relationship between or among the co-occurring entity types and, if the judgment is positive, storing a candidate for the relationship type and a candidate for its label;
    outputting on one or more user devices a result of the analysis for editing by a user; and
    inputting the result and one or more edits by the user into the first machine learning process.

2. The method according to claim 1, the method further comprising enabling a user to input a label of the relationship type between or among co-occurring entity types if there is no label candidate of the relationship type.

3. The method according to claim 1, wherein the document comprises tokens each annotated with an entity type, and the candidate is a token which relates to tokens each annotated with the co-occurring entity types or its base form.

4. The method according to claim 3, wherein the token as the candidate is obtained by parsing the sentence.

5. The method according to claim 3, wherein the token as the candidate is a verb, or a combination of a verb with a preposition, adverb or adjective.

6. The method according to claim 1, wherein the co-occurring entity types are of a combination of a source entity type with a target entity type.

7. The method according to claim 1, wherein annotating the document with entity types is automatically carried out using a dictionary, rules, or a model which is trained by machine learning.

8. The method according to claim 1, wherein annotating the document with entity types is manually carried out.

9. The method according to claim 1, wherein the count is carried out by counting the number of the same pairs of the co-occurring entity types or the number of the candidates for the relationship type which has same label and same pairs of co-occurring entity types.

10. The method according to claim 1, wherein the count and the obtainment are repeated for other sentences in the document or document set comprising the document.

11. The method according to claim 10, wherein the result comprises the co-occurring entity types in the document or document set comprising the document and the number of the pairs of co-occurring entity types in the document or document set comprising the document.

12. The method according to claim 11, wherein the output is performed by sorting the co-occurring entity types, based on the number of pairs of co-occurring entity types and then displaying or printing out the sorted result.

13. A computer system for using one or more candidates for a relationship type and its labels in a first machine learning process, the computer system comprising:
    one or more computer processors;
    one or more computer-readable storage media;
    program instructions stored on the computer-readable storage media for execution by at least one of the one or more processors, the program instructions comprising:
    instructions to collect on one or more processors a document annotated with entity types;
    instructions to analyze on one or more servers the document annotated with entity types, wherein an entity type comprises a definition for annotating a word or phrase in a document, and wherein annotating a word or phrase in the document is automatically carried out using a model trained by a second machine learning process, the analysis comprising:
        instructions to count the number of pairs of co-occurring entity types in each sentence in the document; and
        instructions to judge whether there exists, in the document, a candidate for a label of a relationship type which shows relationship between or among the co-occurring entity types and, if the judgment is positive, storing a candidate for the relationship type and a candidate for its label;
    instructions to output on one or more user devices a result of the analysis for editing by a user; and
    instructions to input the result and one or more edits by the user into the machine learning process.

14. A computer program product for using one or more candidates for a relationship type and its labels in a first machine learning process, comprising:
    one or more computer-readable storage media and program instructions stored on the one or more computer-readable storage media, the program instructions comprising:
    instructions to collect on one or more processors a document annotated with entity types;
    instructions to analyze on one or more servers the document annotated with entity types, wherein an entity type comprises a definition for annotating a word or phrase in a document, and wherein annotating a word or phrase in the document is automatically carried out using a model trained by a second machine learning process, the analysis comprising:
        instructions to count the number of pairs of co-occurring entity types in each sentence in the document; and
        instructions to judge whether there exists, in the document, a candidate for a label of a relationship type which shows relationship between or among the co-occurring entity types and, if the judgment is positive, storing a candidate for the relationship type and a candidate for its label;
    instructions to output on one or more user devices a result of the analysis for editing by a user; and
    instructions to input the result and one or more edits by the user into the machine learning process.

* * * * *